United States Patent
Ding et al.

(10) Patent No.: US 8,081,723 B1
(45) Date of Patent: Dec. 20, 2011

(54) SERIAL DATA SIGNAL EYE WIDTH ESTIMATOR METHODS AND APPARATUS

(75) Inventors: Weiqi Ding, Fremont, CA (US); Sergey Shumarayev, Los Altos Hills, CA (US); Wilson Wong, San Francisco, CA (US); Thungoc M. Tran, San Jose, CA (US)

(73) Assignee: Altera Corporation, San Jose, CA (US)

( * ) Notice: Subject to any disclaimer, the term of this patent is extended or adjusted under 35 U.S.C. 154(b) by 802 days.

(21) Appl. No.: 12/082,343

(22) Filed: Apr. 9, 2008

(51) Int. Cl.
 *H04L 7/00* (2006.01)
(52) U.S. Cl. ........ 375/355; 375/324; 375/326; 375/327; 375/340; 375/354; 375/371; 375/373; 375/375; 375/376; 455/260; 455/502; 455/516; 327/141; 327/147; 327/156; 714/707
(58) Field of Classification Search .................. 375/324, 375/326, 327, 340, 354, 355, 371, 373, 375, 375/376; 455/260, 502, 516; 327/141, 147, 327/156; 714/707
See application file for complete search history.

(56) References Cited

U.S. PATENT DOCUMENTS

| | | | |
|---|---|---|---|
| 7,184,475 B2 * | 2/2007 | Dohmen et al. | 375/232 |
| 7,447,278 B2 * | 11/2008 | Menolfi et al. | 375/340 |
| 7,574,146 B2 * | 8/2009 | Chiang et al. | 398/209 |
| 7,869,544 B2 * | 1/2011 | Sorna et al. | 375/326 |

OTHER PUBLICATIONS

Y. Tomita et al., "A 10-Gb/s Receiver with Series Equalizer and On-Chip ISI Monitor in 0.11-micron CMOS," IEEE Journal of Solid-State Circuits, vol. 40, No. 4, Apr. 2005, pp. 986-993.

* cited by examiner

*Primary Examiner* — Leon Flores
(74) *Attorney, Agent, or Firm* — Ropes & Gray LLP

(57) ABSTRACT

Methods and apparatus for determining at least part of the width of the eye of a high-speed serial data signal use clock and data recovery circuitry operating on that signal to produce a first clock signal having a first phase relationship to the data signal. The first clock signal is used to produce a second clock signal whose phase can be controllably shifted relative to the first phase. The second clock signal is used to sample the data signal with different amounts of phase shift, e.g., until error checking circuitry detects that data errors in the resulting sample exceed an acceptable threshold for such errors. The amount(s) of phase shift that caused exceeding the threshold can be used as a basis for a measurement of eye width.

14 Claims, 5 Drawing Sheets

SERIAL DATA SIGNAL EYE WIDTH ESTIMATOR METHODS AND APPARATUS

BACKGROUND OF THE INVENTION

This invention relates to high-speed serial data communication, and more particularly to methods and apparatus for monitoring the width of the "eye" of a high-speed serial data signal in circuitry that is handling such a signal. The data rate of a typical high-speed serial data signal may be in the range of about 6-10 Gbps (giga-bits per second), although lower and higher data rates are also well known.

In high-speed serial interface ("HSSI") applications, the input signal of a receiver ("RX") integrated circuit device ("chip") is usually attenuated and distorted due to frequency-dependent signal loss across interconnects (e.g., printed circuit board ("PCB") traces from a transmitter ("TX") chip on the PCB to the RX chip on the PCB). This causes inter-symbol interference ("ISI"), which affects the margins for clock and data recovery ("CDR") circuitry on the RX chip. Various RX equalization techniques have been employed to improve the input signal before the CDR circuitry to lower the bit error rate ("BER") of the data recovered from the serial data signal.

A common way to evaluate ISI is by examining the "eye" of the serial data signal. The eye of such a signal is effectively a super-positioning of the waveform of multiple bits in the signal on the time interval of a single bit (a so-called unit interval or UI). A diagram of a signal's eye visualizes the ISI and other jitter components of the signal. An oscilloscope can be used to display the eye of a signal if the signal is accessible to the probes of the oscilloscope.

Some users of RX chips that include equalization circuitry would like to have the ability to observe at least some aspects of the eye of a high-speed serial data signal after processing by the equalization circuitry on the chip. Such a feature can have several benefits. First, such on-chip eye monitoring capability can work like an oscilloscope to probe internal high-speed nodes of the chip that cannot be observed by probing external pins of the chip. Second, the resulting eye information shows the RX equalization results, and this can be used as a basis for making adjustments to the kinds(s) and/or amount(s) of equalization being employed. Third, on-chip eye monitoring can help a system engineer analyze, diagnose, and debug HSSI devices without probes and an oscilloscope in the field.

SUMMARY OF THE INVENTION

In accordance with certain possible aspects of the invention, apparatus for determining at least part of the width of the eye of a serial data signal may include clock and data recovery circuitry for producing a first clock signal having a first phase relationship to a phase of the serial data signal. The apparatus may further include phase shift circuitry for producing a second clock signal having a second phase with a controllably variable phase shift from the first phase. The apparatus may still further include sampling circuitry for using the second clock signal to sample the serial data signal with the second phase to produce an eye-monitor serial data signal. A further element of the apparatus may be error checking circuitry for detecting data errors in the eye-monitor serial data signal.

In accordance with another possible aspect of the invention, a method of determining at least part of the width of the eye of a serial data signal may include performing clock and data recovery on the serial data signal to produce a first clock signal having a first phase relationship to a phase of the serial data signal. The method may further include using the first clock signal to produce a second clock signal having a second phase with controllably variable phase shift from the first phase. The method may still further include using the second clock signal to sample the serial data signal with the second phase to produce an eye-monitor serial data signal. Another element of the method may include checking the eye-monitor serial data signal for data errors.

Further features of the invention, its nature and various advantages, will be more apparent from the accompanying drawings and the following detailed description.

DETAILED DESCRIPTION

Figure 1:
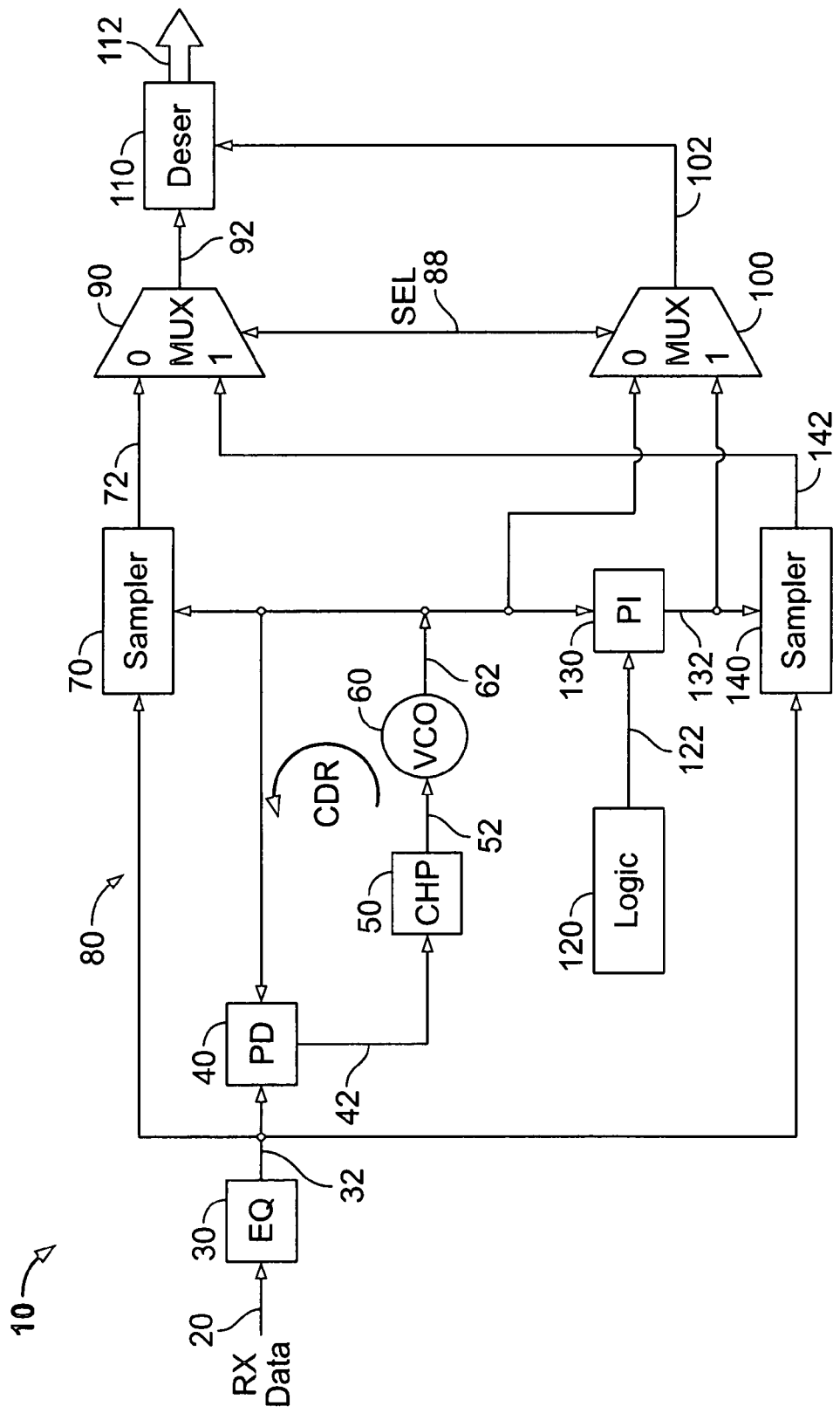
FIG. 1 is a simplified block diagram of an illustrative embodiment of circuitry in accordance with the invention.

An illustrative embodiment of circuitry 10 in accordance with the invention is shown in FIG. 1. A high-speed serial data signal 20 is applied to equalizer circuitry 30. Equalizer circuitry 30 performs some equalization on signal 20 and passes the resulting serial data signal (now reference-numbered 32) on to phase detector 40 and sampler 70.

Phase detector circuitry 40 compares the phase of signal 32 to the phase of a feedback clock signal 62 in clock and data recovery ("CDR") circuitry 80, which includes components 40, 50, and 60 connected in a closed-loop series. Phase-error signals 42 produced by phase detector 40 are applied to charge pump circuitry 50.

Charge pump circuitry 50 uses the signals 42 it receives to determine whether the frequency of the clock signal 62 produced by voltage-controlled oscillator ("VCO") circuitry 60 needs to be increased (advanced) or decreased (retarded) so that the phase of that clock signal will work better with the phase of serial data signal 32. The output 52 of charge pump circuitry 50 thus controls the frequency (and hence the phase) of VCO output clock signal 62. Clock signal 62 is applied to phase detector 40 and also to sampler (or sampling) circuitry 70 (among other uses that will be described later).

Sampler 70 uses clock signal 62 to sample serial data signal 32 to produce a retimed serial data signal 72. (CDR 80 can be set up to partially deserialize signal 32 as part of sampling it in sampler 70. Thus, instead of being a single retimed serial data signal, the output 72 of sampler 70 could alternatively be two, four, or more signals, each of which includes a respective portion of the incoming serial data. Such possible alternatives are well known to those skilled in the art and therefore need not be further described here. In the interest of simplicity, it will be assumed that the output 72 of sampler 70 is only a single retimed serial data signal. The same assumption will be made with regard to the output 142 of later-described sampler 140. These assumptions will not limit the scope of the invention.) The output signal 72 of sampler 70 is applied to one of the selectable inputs of multiplexer 90.

During "normal" mode operation of circuitry 10 (as distinguished from later-described "eye monitor" mode operation of that circuitry), multiplexer 90 is controlled by a selection control input signal 88 to connect its input 72 to its output 92. Also in normal mode operation, selection control signal 88 controls multiplexer 100 to select clock signal 62 (as a recovered clock signal) for application to a clock input lead 102 of deserializer circuitry 110.

The output signal 92 of multiplexer 90 is applied to a data input terminal of deserializer circuitry 110, which uses clock signal 102 to convert the serial data signal 92 to parallel form on a plurality of parallel output leads 112. Further circuitry on the chip that includes circuitry 10 may analyze and otherwise make use of parallel data 112 (see, for example, the discussion of FIG. 3 later in this specification). Typical capabilities of the circuitry downstream from deserializer 110 include the ability to perform various error checking operations on parallel data 112. Examples include cyclic redundancy checking ("CRC"), bit error rate ("BER") checking, etc.

The above detailed description is all of circuitry (except for multiplexers 90 and 100) that was known prior to the present invention.

In accordance with the present invention, the output clock signal 62 of VCO 60 is also applied to phase interpolator circuitry 130. Phase interpolator circuitry 130 is circuitry that can shift the phase of the clock signal it receives by an amount determined by control signals 122 from logic or control circuitry 120. The resulting phase-shifted clock signal 132 is applied to a clock input terminal of sampler (or sampling) circuitry 140. (Circuitry 130 may sometimes be referred to as phase shift circuitry or the like.)

Sampler circuitry 140 uses clock signal 132 to sample serial data signal 32 to produce what may be referred to as an eye-monitor serial data signal 142, which circuitry 140 applies to the second selectable input terminal of multiplexer circuitry 90. Control logic circuitry 120 can cause the phase of clock signal 132 to vary from being at or near the center of the eye of signal 32, to being shifted in either direction from the center of the eye by controllably variable or selectable amounts. This will be discussed in more detail later in this specification. (It is again assumed that circuitry 140 outputs only one eye-monitor serial data signal 142. But if circuitry 70 outputs more than one retimed data signal 72, then circuitry 140 should be constructed and operated similarly to produce similar eye-monitor data signals 142.)

In eye monitor mode, multiplexer 90 is controlled by signal 88 to connect its input 142 (instead of its input 72) to its output 92. Also in eye monitor mode, multiplexer 100 is controlled by signal 88 to connect its input 132 (instead of its input 62) to its output 102. These conditions allow circuitry 110 and all downstream circuitry (to the extent desired) to operate on eye-monitor signal 142 in the same way that all of that circuitry operates on serial data signal 72 in normal operation mode. Further discussion may now be aided by also considering FIG. 2.

Figure 2:
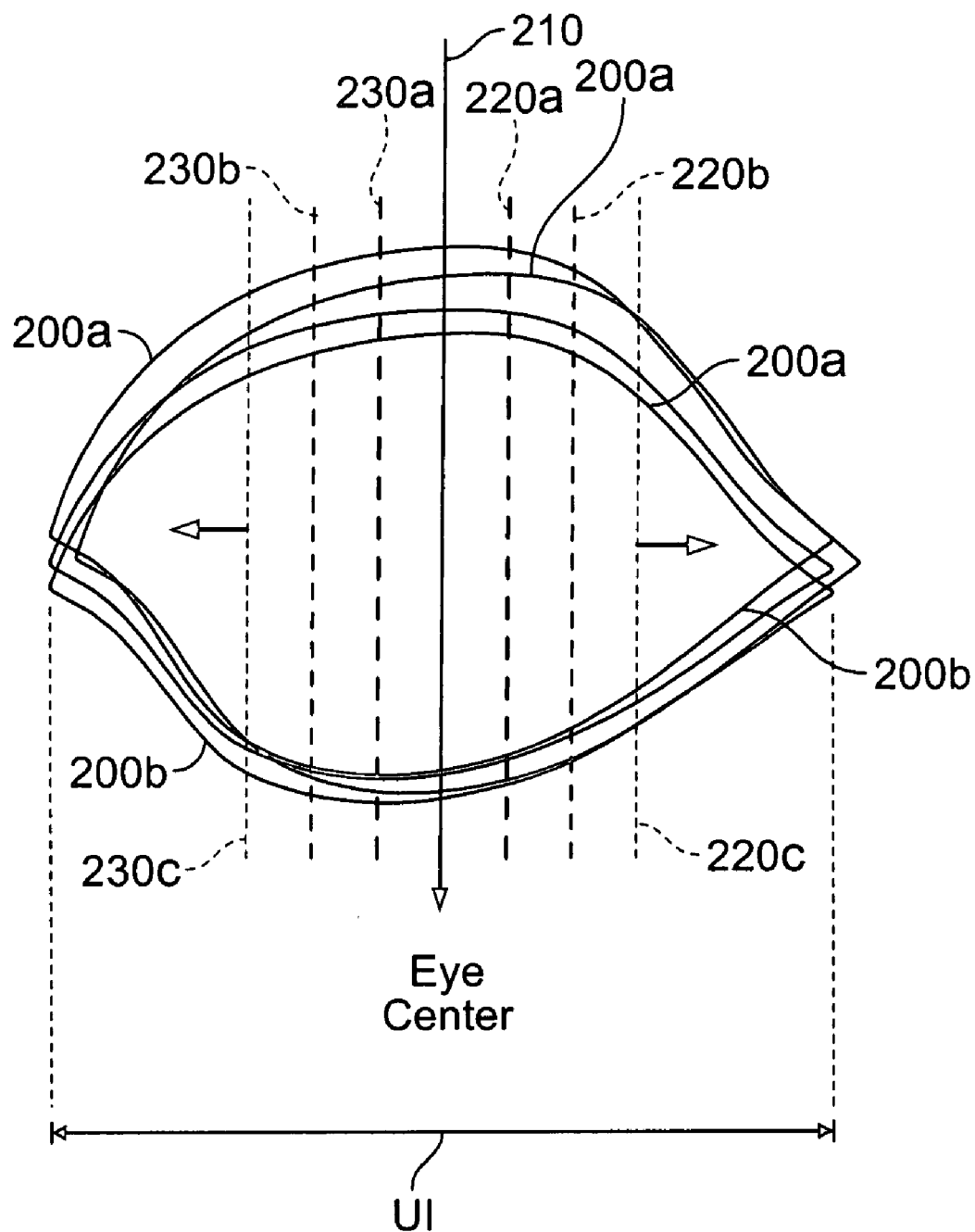
FIG. 2 is a simplified signal trace ("eye") diagram that is useful in explaining certain aspects of the invention.

An illustrative eye diagram is shown in FIG. 2. The upper curves 200a in FIG. 2 are signal traces for positive-going bits in a serial data signal that have been super-imposed on one another in one UI. The lower curves 200b in FIG. 2 are signal traces for negative-going bits in a serial data signal that have been superimposed on one another in the same UI. The open space inside the eye diagram, through which none of the upper or lower curves 200a or 200b pass, is the usable or "open" eye of the serial data signal. In general, the wider (and higher) this open portion of the eye, the better for reliable interpretation and handling of the serial data signal (e.g., to recover data from that signal with the fewest incorrectly interpreted bits). The present invention facilitates measuring the width of such an eye. The width of the eye is the left-to-right dimension of the open area inside the eye (e.g., the fraction of one UI that is reliably free from any of signal traces 200). Although overall open eye width can thus be important to know, it can also be important to know how the open eye width is distributed relative to the nominal center 210 of the eye or a UI. This invention can also be used to gather that kind of information.

To examine the eye of signal 32 in accordance with the invention, circuitry 10 may first be operated in normal mode until CDR circuitry 80 is processing signal 32 with stability. When CDR 80 is stable, the VCO output clock 62 may have phase that is at the nominal center of the eye. (Note that CDR circuitry 80 continues to operate in this way during all of the below-described operation of the other circuitry.) Control logic 120 may then cause clock signal 132 to have phase suitable for sampling signal 32 at the nominal center 210 of the eye (or of the UI). Control logic 120 then controls multiplexer 90 (via signal 88) to switch to connecting its input 142 to its output 92, and it similarly controls multiplexer 100 to switch to connecting its input 132 to its output 102. Multiplexers 90 and 100 can remain in this state throughout the remainder of eye monitor mode operation of circuitry 10.

With clock signal 132 having above-described phase 210, error checking circuitry downstream from deserializer 110 is used to make sure that the data from eye-monitor serial data signal 142 is acceptably free from errors (e.g., acceptably low BER). For purposes of further discussion, it will be assumed that signal 142 (taken with sampling clock signal 132 having phase 210) is found to have acceptably few or no errors.

After above-described eye-monitor serial data signal 142 has been found to be acceptable, control logic 120 can shift the phase of clock signal 132 to the right (or left) as viewed in FIG. 2. For example, assume that control logic 120 first shifts the phase of clock signal 132 to the right, then the phase of that signal may first be shifted to phase 220a. This causes sampler 140 to sample serial data signal 32 at a different point in the eye of that signal to produce a differently phased eye-monitor serial data signal 142. Again, downstream circuitry determines whether or not this newly phased eye-monitor signal is still acceptably free from errors. If so, the above process is repeated with gradually greater clock 132 phase shifts from center 210 (e.g., at phase 220b, then at phase 220c, etc.). At some point, the phase shift from center 210 will become great enough that the resulting eye-monitor serial data signal 142 will be found to no longer have an acceptably low data error rate. This amount of phase shift can be identified by control logic 120 as being just beyond the right-hand edge of the width of the eye (of signal 32) as viewed in FIG. 2. For example, the right-hand edge of the eye may be identified as being associated with the immediately preceding right-ward phase shift that did not cause eye-monitor serial data signal 142 to have unacceptably high data errors.

After the right-hand edge of the eye has been located as described above, control logic 120 can begin to test phase shifts of clock 132 that are to the left of phase 210 in FIG. 2. For example, control logic 120 can test phase 230a, then phase 230b, then phase 230c, and so on, until the resulting eye-monitor serial data signal 142 is again found to contain an unacceptably large number or percentage of data errors (erroneous data bits). The left-shifted phase at which that first occurs can be interpreted as being just to the left of the left-hand edge of the width of the eye (of signal 32) as viewed in FIG. 2. Again, for example, the left-hand edge of the eye may be associated with the immediately preceding left-ward phase shift that did not cause eye-monitor serial data signal 142 to have unacceptably high data errors.

It will be apparent from the foregoing how the invention can be used to measure the width of the eye of a serial data signal. This measurement of eye width can include separate measurement of the amount of width that is to the left and/or right of a nominal center of the eye. Eye width information of any of these kinds can be used, for example, as a basis for adjustment of the kind(s) and/or amount(s) of equalization performed by circuitry such as 30 in order to improve eye characteristics of the resulting serial data signal 32.

Figure 3:
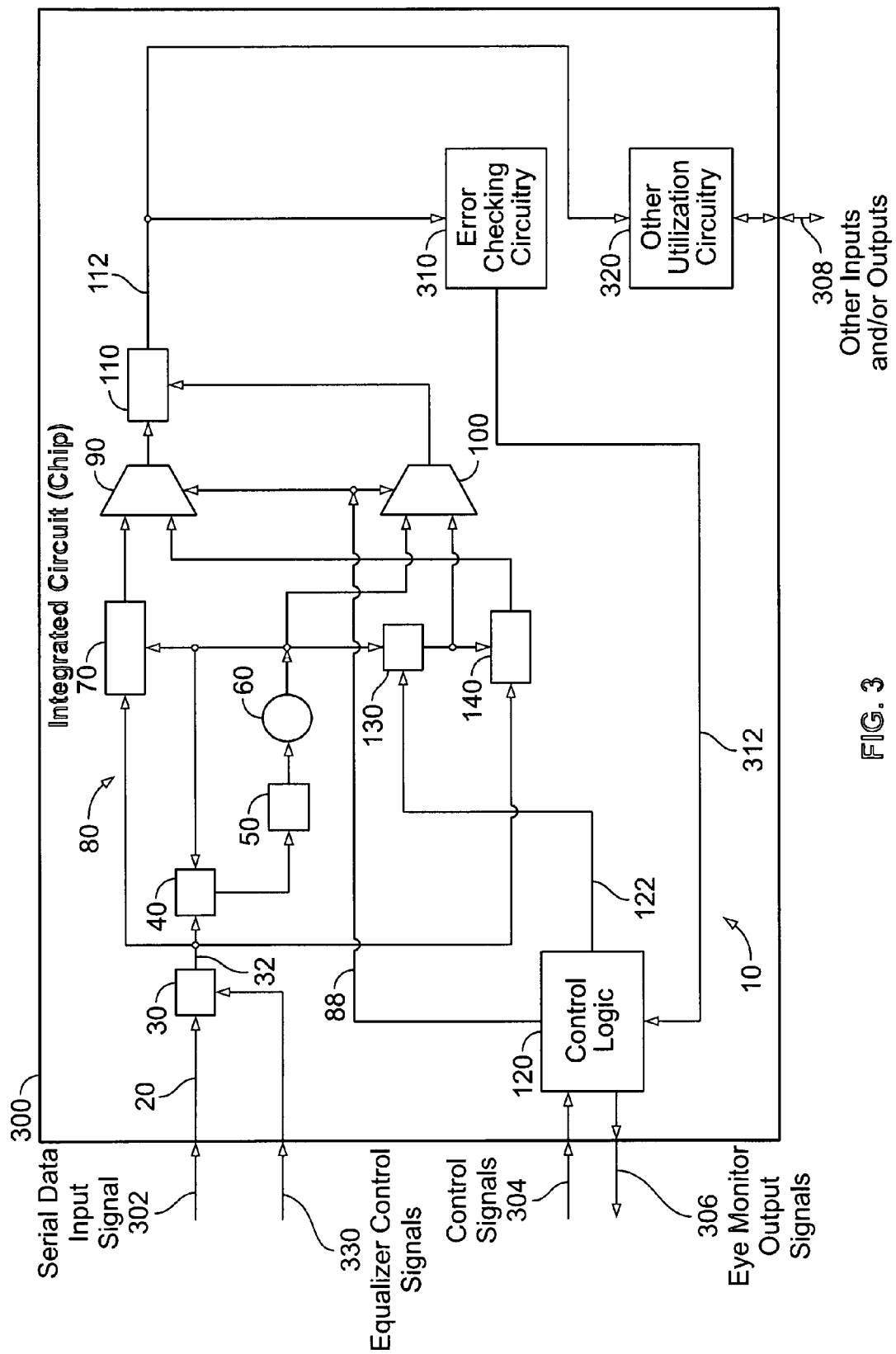
FIG. 3 is a simplified diagram of an illustrative embodiment of an integrated circuit device or chip constructed in accordance with the invention.

An illustrative embodiment of an integrated circuit or chip 300 that includes circuitry like circuitry 10 is shown in FIG. 3. FIG. 3 again repeats all of the elements of circuitry 10. FIG. 3 additionally shows serial data signal 20 coming from a serial data input signal 302 that is applied to chip 300 from an external source. FIG. 3 shows that some aspects of the operation of equalizer components like 30 may be controlled by equalizer control signals 330 that are applied to chip 300. These signals may control programmable and/or reprogrammable elements on chip 300, which elements may in turn control component 30. Control logic 120 may be controlled by control signals 304 that are applied to chip 300. For example, these control signals may (1) enable/disable operation of logic 120 to place chip 300 in either normal mode or eye monitor mode, and (2) control certain aspects of the performance of eye monitor mode (e.g., how many different phase shifts like 220 and 230 should be tested, what amounts or rates of data errors are to be treated as acceptable or unacceptable, etc.). Some of these control signals 304 may control programmable and/or reprogrammable elements on chip 300, which elements in turn influence operation of control logic 120.

FIG. 3 shows control logic 120 controlling multiplexers 90 and 100 via lead 88. FIG. 3 also shows control logic 120 outputting (on leads 306) signals indicative of the progress and/or results of the eye monitoring performed as described herein. FIG. 3 shows parallel data 112 being applied to error checking circuitry 310 (e.g., of any conventional type such as CRC, BER, etc.) and to other utilization circuitry 320. FIG. 3 shows error checking circuitry 310 reporting the results of its error checking operations to control logic 120 via lead(s) 312. Circuitry 320 can be any type(s) of circuitry for performing any desired operation(s) on parallel data 112. Circuitry 320 may receive other inputs and/or produce other outputs 308 external to chip 300.

Figure 4A:
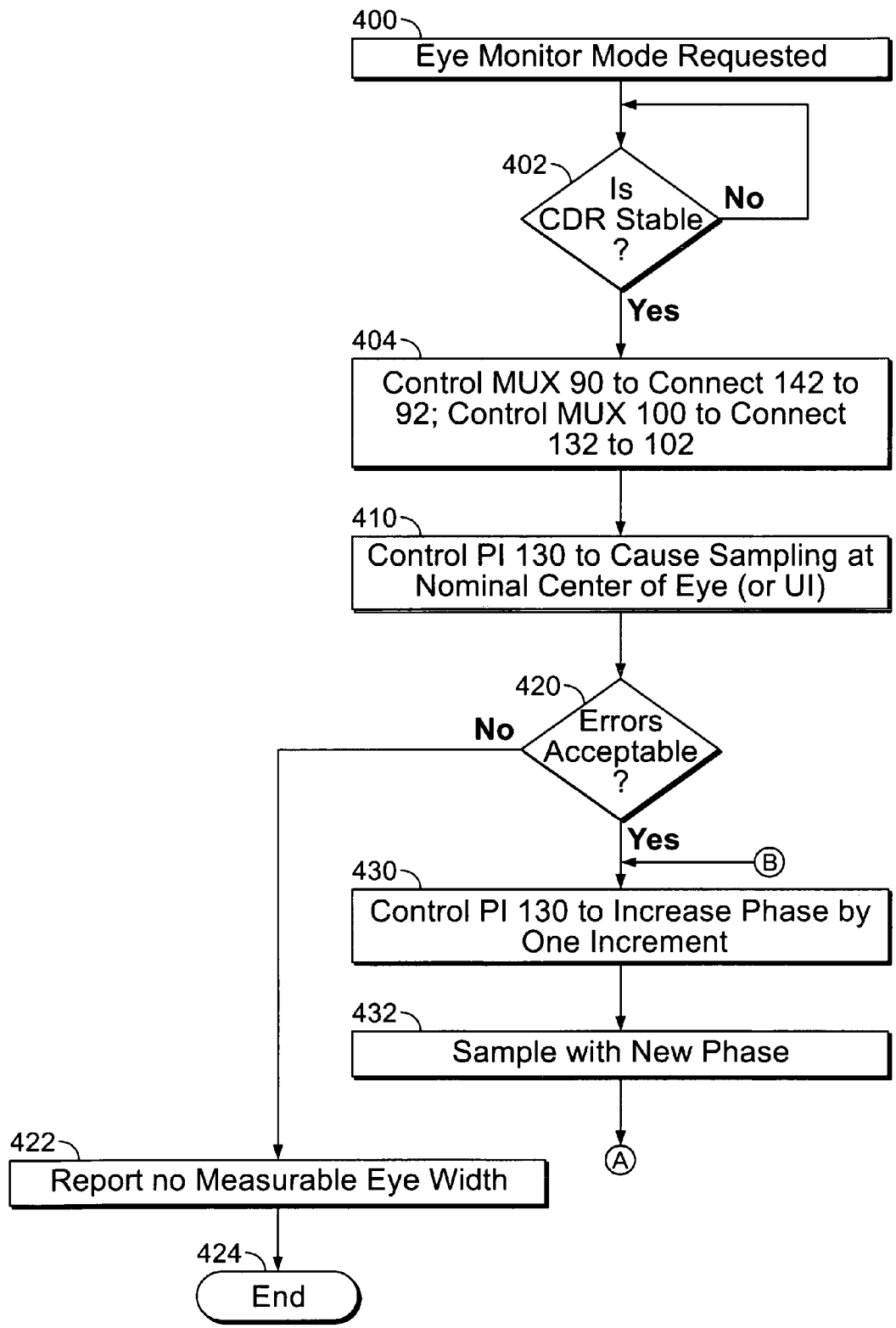
FIGS. 4a and 4b are collectively a simplified flow chart of an illustrative embodiment of methods in accordance with the invention.
Figure 4B:
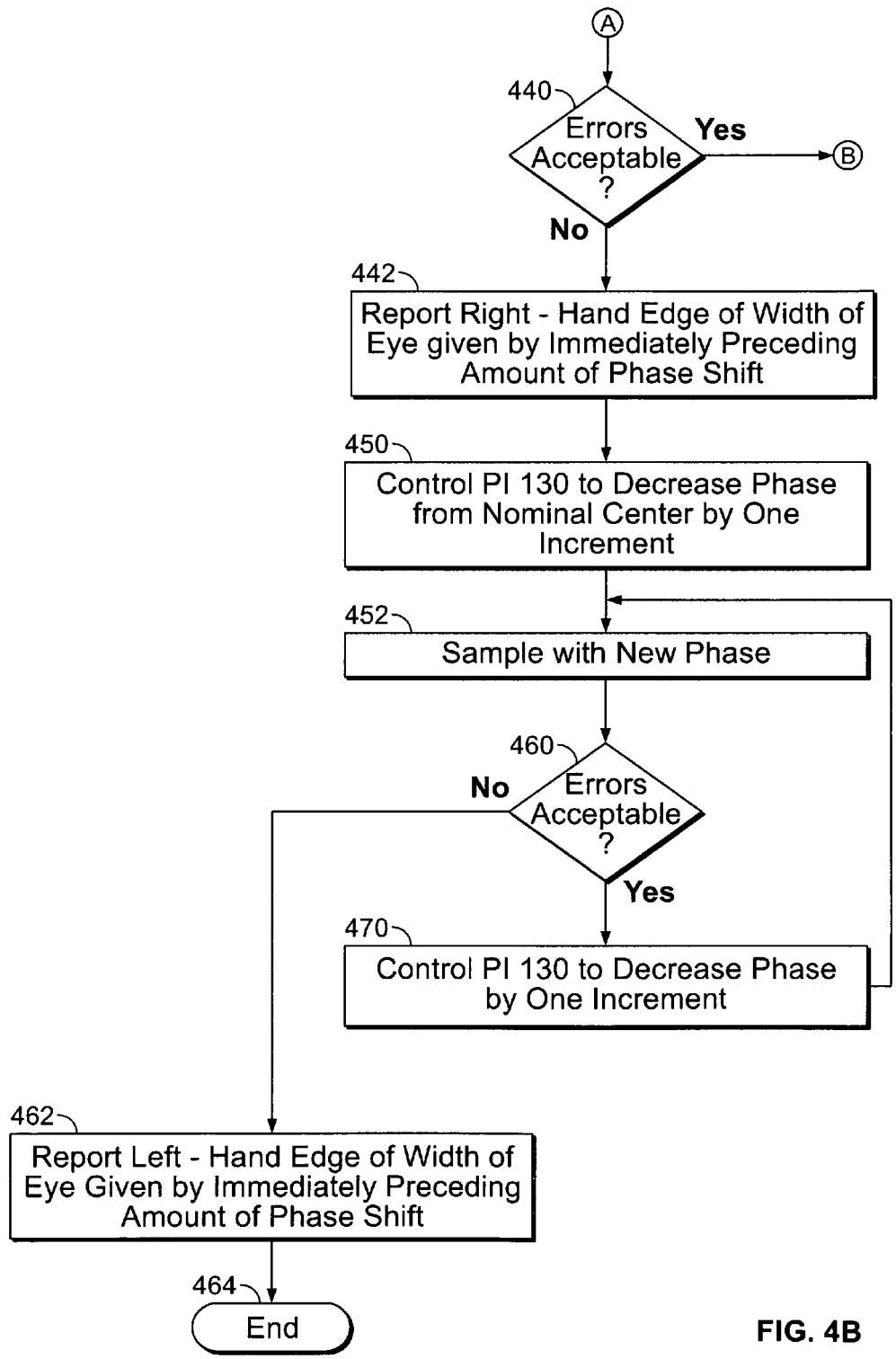

FIGS. 4a and 4b collectively show an illustrative embodiment of methods in accordance with the invention. Control logic 120 can execute or at least control the execution of the various steps shown in FIGS. 4a and 4b. Some of these steps may actually be carried by other circuit elements as shown, for example, in FIG. 1 and/or FIG. 3.

In step 400 eye monitor mode is requested, e.g., by asserting an "enable" signal applied to control logic 120 via one of leads 304.

In step 402 control logic 120 tests whether or not CDR 80 is stable. This can be done in any number of ways, such as by making sure that the frequency of phase-error signals 42 is relatively low. If not, control loops back until CDR 80 is acceptably stable, after which control passes to step 404.

In step 404, control logic 120 causes multiplexer 90 to connect its input 142 to its output 92, and it also causes multiplexer 100 to connect its input 132 to its output 102.

In step 410 control logic 120 causes phase interpolator 130 to produce a clock signal 132 suitable for causing sampler 140 to sample signal 32 at the nominal center 210 of the eye (or of UI).

In step 420 control logic 120 monitors results from error checking circuitry 310 for whether or not data errors in signal 142 exceed a threshold for such errors. If the threshold has been exceeded, control passes to step 422, in which control logic 120 may produce an output (e.g., via leads 306) indicating that no measurable eye width has been found. The eye monitoring process may then end at 424. On the other hand, if step 420 has a favorable outcome, control passes from that step to step 430.

In step 430, control logic 120 may cause phase interpolator 130 to increase the amount of phase shift of clock signal 132 by a certain amount. Control then passes to step 432, in which sampler 140 samples signal 32 at the new phase (e.g., 220a in FIG. 2). Control then passes to step 440.

Step 440 is like another performance of above-described step 420. If step 440 finds that the data error threshold has been exceeded, control passes from step 440 to step 442. Otherwise control passes back to step 430 for another incremental phase increase, followed by another performance of steps 432 and 440. Control remains in this loop until step 440 finds an unacceptable level of data errors and control passes to step 442.

When step 442 is reached, control logic 120 can report having located the right-hand edge of the width of the eye. For example, this right-hand edge may be taken as being given by the amount of phase shift before the amount of phase shift that caused step 440 to find an unacceptable level of data errors. Control logic 120 can make the "report" referred to in step 442 via leads 306. Control passes from step 442 to step 450.

In step 450 control logic 120 causes phase interpolator 130 to select a phase for clock 132 that is decreased by one phase shift increment from center 210 (e.g., like phase 230a in FIG. 2). Control then passes to step 452.

Step 452 is like step 432 and therefore need not be further described. Step 460 follows.

Step 460 is like step 440 and therefore also does not require further explanation. Step 460 is followed by either step 462 or step 470. If step 470 follows, then the phase of clock 132 is decreased by one more increment (e.g., to phase 230b in FIG. 2) and control passes back to step 452 in a loop like the above-described loop including steps 430, 432, and 440.

When step 462 is eventually reached, the left-hand edge of the width of the eye has been found, and control logic 120 can report this result (e.g., via leads 306). For example, this report can be based on the amount of phase shift immediately prior to the amount that caused step 462 to be reached. The eye monitoring process may end at 464.

Some of the possible advantages of the invention are as follows. The invention does not require any special, fixed, and/or repeated input data pattern or patterns. All that is required is for the circuitry to operate on the serial data signal long enough with each different amount of phase shift in clock signal 132 to determine whether or not data errors have exceeded a threshold of acceptability for such errors. Data errors can be monitored on the parallel side of the circuitry (i.e., downstream from deserializer 110). The information gathered about the eye can be used to provide feedback for RX equalization adjustment (e.g., via control signals 330). The invention facilitates in-field, system-level diagnosis and debugging of HSSI devices. Yet another advantage of the invention is that CDR circuitry 80 can remain in lock-to-data mode throughout operation of the circuitry in eye monitor mode.

It will be understood that the foregoing is only illustrative of the principles of the invention, and that various modifications can be made by those skilled in the art without departing from the scope and spirit of the invention. For example, the order in which different amounts of phase shift of signal 132 are employed can be different from the order employed in the illustrative embodiments specifically described herein.

The invention claimed is:

1. Apparatus for determining at least part of a width of an eye of a serial data signal, the apparatus comprising: clock and data recovery circuitry for producing a first clock signal having a first phase, said first phase having a first phase relationship to a phase of the serial data signal; phase shift circuitry for receiving the first clock signal and producing a second clock signal based on the first clock signal and having a second phase with a controllably variable phase shift from the first phase; sampling circuitry for using the second clock signal to sample the serial data signal to produce an eye-monitor serial data signal; error checking circuitry for detecting data errors in the eye-monitor serial data signal; and control circuitry for varying the phase shift through a succession of different amounts of phase shift, wherein the control circuitry first gradually increases the amount of phase shift in a first direction from a starting amount until the error checking circuitry detects data errors exceeding a threshold, and wherein the control circuitry thereafter gradually increases the amount of phase shift in a second direction from the starting amount until the error checking circuitry again detects data errors exceeding the threshold.

2. The apparatus defined in claim 1 wherein the control circuitry gradually increases the amount of phase shift from a starting amount of phase shift until the error checking circuitry detects data errors exceeding the threshold for such data errors.

3. The apparatus defined in claim 2 wherein, when the error checking circuitry detects data errors exceeding the threshold, the control circuitry bases an indication of the width of the eye at least in part on the amount of phase shift that caused the threshold to be exceeded.

4. The apparatus defined in claim 3 wherein, when the error checking circuitry again detects data errors exceeding the threshold, the control circuitry bases a further indication of the width of the eye at least in part on the amount of phase shift that caused the threshold to again be exceeded.

5. The apparatus defined in claim 1 wherein the error checking circuitry comprises:
    deserializer circuitry for converting the eye-monitor serial data signal to parallel form data signals; and
    parallel-form error checking circuitry for detecting data errors in the parallel form data signals.

6. An integrated circuit comprising apparatus as defined in claim 1.

7. A method of determining at least part of a width of an eye of a serial data signal, the method comprising: performing clock and data recovery on the serial data signal to produce a first clock signal having a first phase, said first phase having a first phase relationship to a phase of the serial data signal; receiving the first clock signal at a phase shift circuitry; using the first clock signal to produce a second clock signal having a second phase with a controllably variable phase shift from the first phase; using the second clock signal to sample the serial data signal to produce an eye-monitor serial data signal; checking the eye-monitor serial data signal for data errors; and varying the phase shift through a succession of different amounts of phase shift, wherein the amount of phase shift in a first direction is first gradually increased from a starting amount until the error checking circuitry detects data errors exceeding a threshold, and thereafter the amount of phase shift in a second direction gradually increased from the starting amount until the error checking circuitry again detects data errors exceeding the threshold.

8. The method defined in claim 7 further comprising:
    basing an indication of the width of the eye at least in part on when the varying causes the checking to detect that the data errors have exceeded a threshold for such errors.

9. The method defined in claim 7 further comprising:
    basing an indication of the width of the eye at least in part on the amount of phase shift that causes the checking to detect data errors in excess of the threshold for such errors.

10. The method defined in claim 7 further comprising:
    stopping the gradually making on each side of the starting amount of phase shift when the checking detects that the gradually making has caused the data errors to exceed the threshold for such errors.

11. The method defined in claim 7 wherein the checking comprises:
    deserializing the eye-monitor serial data signal to convert data from that signal to parallel form data; and
    subjecting the parallel form data to data error checking.

12. Apparatus for determining at least part of a width of an eye of a serial data signal, the apparatus comprising: clock and data recovery circuitry for producing a retimed serial data signal and a recovered clock signal from the serial data signal;
    phase shift circuitry for receiving the recovered clock signal and producing an eye-monitor clock signal based on the recovered clock signal and having phase that is controllably variable from a phase of the recovered clock signal; sampling circuitry for using the eye-monitor clock signal to sample the serial data signal with the phase of the eye-monitor clock signal to produce an eye-monitor serial data signal; error checking circuitry for detecting data errors in the eye-monitor serial data signal; and control circuitry for varying the phase of the eye-monitor clock signal through a succession of different amounts of phase shift, wherein the control circuitry first gradually increases the amount of phase shift in a first direction from a starting amount until the error checking circuitry detects data errors exceeding a threshold, and wherein the control circuitry thereafter gradually increases the amount of phase shift in a second direction from the starting amount until the error checking circuitry again detects data errors exceeding the threshold.

13. The apparatus defined in claim 12 wherein the succession of different phases includes some phases that are on one side of the phase of the recovered clock signal, and other phases that are on the other side of the phase of the recovered clock signal.

14. An integrated circuit comprising apparatus as defined in claim 12.

* * * * *